Figure 4:
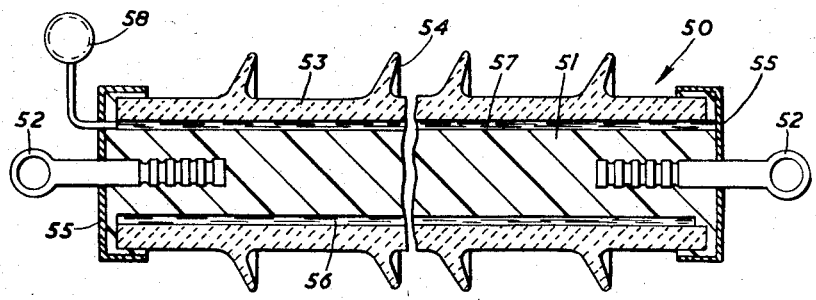

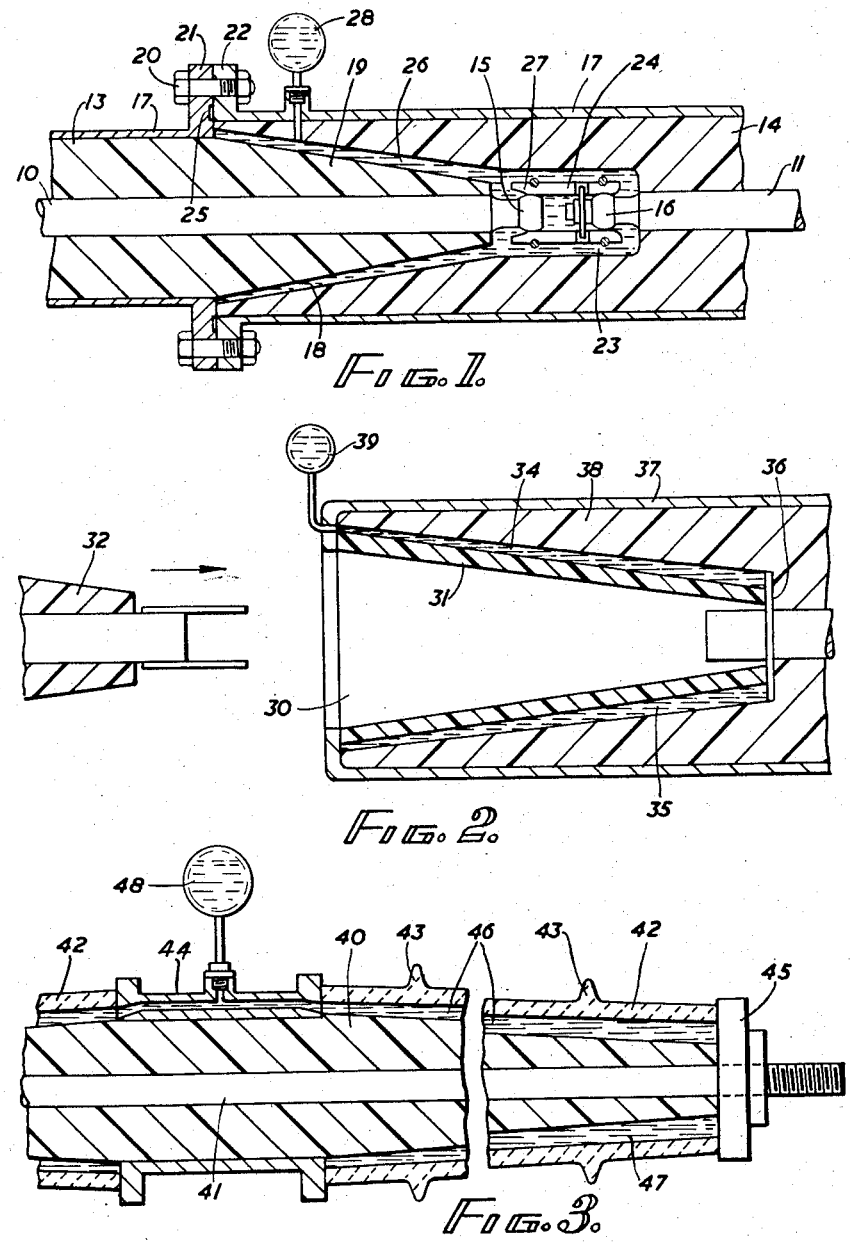

July 7, 1959  A. B. CAMERON ET AL  2,894,054
VOLTAGE GRADING IN HIGH-VOLTAGE SWITCHGEAR INSULATION
Filed June 23, 1955  2 Sheets-Sheet 2

INVENTORS
ALASDAIR B. CAMERON
JOHN CHRISTIE
THOMAS R MANLEY

BY Watson, Cole, Grindle & Watson
ATTORNEYS

United States Patent Office 2,894,054
Patented July 7, 1959

2,894,054

VOLTAGE GRADING IN HIGH-VOLTAGE SWITCHGEAR INSULATION

Alasdair Blair Cameron, Monkseaton, Northumberland, John Christie, Sunderland, and Thomas Rae Manley, Newbiggin-by-the-Sea, Northumberland, England, assignors to A. Reyrolle & Company Limited, Hebburn, England, a company of Great Britain, and Moser-Glaser & Co., A.G., Muttenz, Switzerland, a company of Switzerland Application June 23, 1955, Serial No. 517,602

Claims priority, application Great Britain June 25, 1954

6 Claims. (Cl. 174—21)

This invention relates to electrical apparatus having conductors constituting electrodes between which a high voltage exists, separated by insulation of solid dielectric material having surfaces extending between the electrodes which are exposed to the air, or having air-filled interstices in the solid dielectric material.

At high voltages such surfaces or interstices are liable to local discharges or flash-over at regions where the voltage stress is concentrated, as a result of which the insulation adjacent to the discharge deteriorates and will eventually fail completely.

To protect the insulation against local discharges of this nature it has been proposed to control the voltage gradient between the electrodes so as to avoid any undue concentrations of stress, and for this purpose the solid insulation has been provided with spaced condenser layers or plates providing capacitance grading of the voltage drop. This arrangement is convenient for bushing or like insulators made of wound paper, since conducting layers of metal foil can easily be inserted in the paper insulation at the correct spacing during winding to act as capacitance plates. However, when the solid insulation is homogeneous and is formed by compression moulding, for instance from synthetic resin, the embedding of foil-type capacitance layers presents great difficulty on account of their flimsiness, and it is practically impossible to position the layers sufficiently accurately.

The present invention is concerned with controlling the voltage gradient between the electrodes by passing a small leakage current through a high resistance extending between the electrodes, and can be employed in cases where capacitance-type voltage grading would be out of the question on account of manufacturing difficulties, as well as in direct-current applications where capacitance control of the voltage gradient would in any case be ineffective.

According to the present invention, at least one interstice in the solid insulation extends between the electrodes and is filled with an elongated liquid voltage-grading resistor of high dielectric strength and of such electrical conductivity as to pass between the electrodes a small in-phase leakage current comparable with the quadrature current in magnitude.

Thus the dielectric material used for the liquid resistor may be regarded either as high resistance conductor or as an inferior insulator. The terms conductor and insulator may conveniently be contrasted by considering the power factor, or relation of in-phase component to quadrature component, of the current that flows when the material is stressed by a voltage of a given frequency. In the case of materials normally used as conductors the in-phase (resistive) component at normal power frequencies would normally be some thousands of times the magnitude of the quadrature (capacitative) component, whereas with a good insulator the latter component would be some thousands of times the in-phase component.

In the case of the material used for the present invention the in-phase component must be of the same order as the capacitative current, say not less than one tenth of it. The term "liquid" used in this specification in connection with the liquid resistor in the interstice is intended to include materials that are semi-liquid, for instance in paste or jelly form, such as can be injected into the interstice even though they will not flow into it and fill it without external assistance. The term "liquid" is meant to exclude gases.

The specific resistance of the conducting liquid used can lie within a wide range of values and its choice is dependent on the voltage, since the in-phase leakage current must be limited to a value such that the heat generated can be safely dissipated. In practice this means that the in-phase leakage current should not exceed about one milliampere. Subject to this limitation, the higher the in-phase leakage current the more effective the voltage grading.

Many liquid materials have the required electrical characteristics for use as the filling medium, for instance amines, alcohols, glycols, chlorohydrine and phenols, and mixtures of these; hexylene glycol in particular has proved very satisfactory.

It will be evident that other liquir materials having the required electrical characteristics could be found in other organic homologous series.

The interstice in the solid insulation which is filled with the conducting liquid may take the form of a tubular space of annular cross-section surrounding a central electrode and electrically connected between it and an outer electrode. In this case the voltage gradient along the tubular space may be varied by variations in the radius and/or in the radial thickness of the tubular space.

Again, the interstice may take the form of one or a series of internal tunnels formed in the solid insulation and extending between the electrodes.

Figure 5:
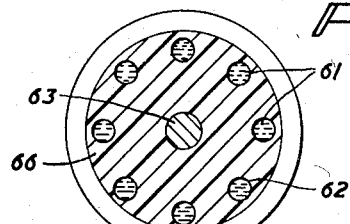
Figure 6:
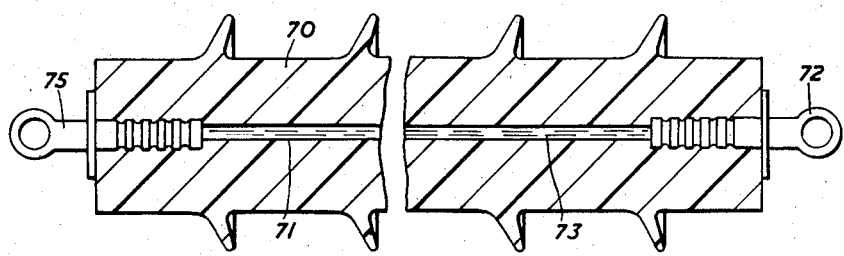
Figure 7:
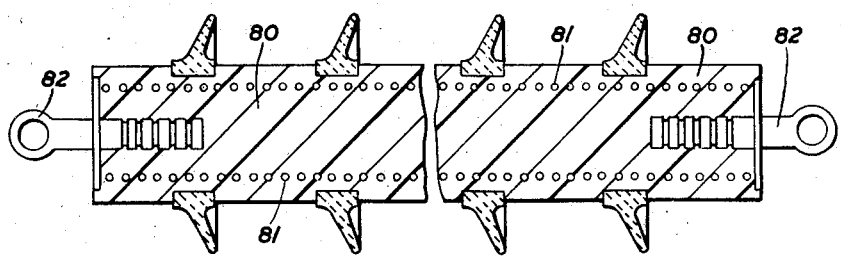

The invention may be carried into practice in various ways, but certain specific embodiments will now be described by way of example with reference to the accompanying drawings, in which Figure 1 is a sectional view of a semi-permanent plug-and-socket connection between two solid-insulated high-voltage conductors, Figure 2 is a sectional view of a detachable plug-and-socket connecting means for a plug-in type of detachable circuit-breaker, Figure 3 is a sectional side view of a part of a bushing-type insulator for a high-voltage conductor, Figure 4 is a sectional side view of a suspension insulator, Figure 5 is a cross-section of a modified form of bushing insulator, Figure 6 is a sectional side view of a modified form of suspension insulator, and Figure 7 is a sectional side view of yet another modified form of suspension insulator.

In the embodiment of Figure 1, the invention is applied to a plug-and-socket arrangement for providing a semi-permanent end-to-end connection between a pair of elongated high-voltage conductors 10 and 11. The two conductors 10 and 11 are enclosed in sleeves 13, 14 of solid insulating dielectric material except at their terminations where they project and take the form of terminals 15 and 16. Each insulating sleeve is provided with an outer casing 17 of earthed metal, and one of the sleeves 14 is formed at its end with a frusto-conical coaxial socket 18 which contains the associated terminal 16 whilst the other sleeve 13 is formed with a coaxial frusto-conical plug 19 from which the terminal 15 of the associated conductor 10 projects. The two sleeves 13 and 14 are bolted together end to end by means of a bolted connection 20 between radial flanges 21, 22 on their earthed metal casings, with the plug 19 inserted in the socket 18, and the two terminals 15 and 16, which are then adjacent one another in a recess 23 formed by the base of the socket 18, are interconnected electrically by means of a suitable spring connector 24. A liquid-tight sealing ring 25 is disposed between the flanges 21 and 22.

With the parts in their assembled relationship as described, there remains between the outer surface of the insulating plug 19 and the inner surface of the insulating socket 18 a narrow interstice 26 of frusto-conical shape and of annular transverse section, the outer and inner surfaces defining this interstice being parallel to one another so that it is of uniform thickness. This interstice 26 is filled with high-resistance conducting liquid 27, which also fills the recess 23 at the base of the socket 18 and is in electrical contact both with the two interconnected high-voltage conductors 10 and 11 at one end of the interstice 26 and with the earthed metal casings 17 at the other end. The liquid 27 used is chosen to have a suitably high dielectric strength to withstand the electro-static voltage stress to which it is subjected, and a sufficiently high specific resistance, for example 10 megohm centimetres, to pass a leakage current small enough for the heat generated thereby to be dissipated safely. In practice the in-phase leakage current should not exceed about 1 milliampere.

It will be realised that since the thickness of the liquid resistor constituted by the layer of resistive liquid 27 filling the interstice 26 is small, the voltage drop across the layer 27 will be small, whereas along the layer the voltage drop will be equal to the full voltage between the conductors 10, 11 and earth.

To minimise distortion of the radial electrostatic field, the voltage at every point along the liquid resistor 27 should be equal to the electrostatic potential at that point due to the radial field, but with concentric conductors the radial potential gradient is not uniform but decreases with the radial distance outwards from the central conductors 10, 11. The voltage gradient along the liquid resistor 27 is partially matched to this by virtue of the conical shape of the interstice 26, since the cross-sectional area of the liquid layer 27 decreases progressively towards its smaller, inner end and its resistance per unit length will vary inversely with the cross-sectional area, so that partial compensation is automatically provided.

Accurate matching of the voltage distribution along the length of the liquid layer to the radial electrostatic potential can however be obtained either by appropriately varying the radial thickness of the layer 27 along its length, or by suitably curving the surfaces of the interstice 26 in the longitudinal direction to provide a liquid layer 27 having an exponential shape, or by a combination of both these methods.

Voltage grading is thus provided along the surfaces of the interstice 26 by means of the liquid layer 27, and the radial thickness of the solid dielectric between the inner conductors 10, 11 and the outer earthed metal layer 17 is only governed by the maximum permissible radial dielectric stress.

A leak-proof joint is provided by the sealing ring 25 between the bolted flanges 21 and 22 of the earthed-metal casing 20, and if desired a liquid reservoir indicated at 28 can be provided to make good any loss of liquid from the interstice and to allow for expansion.

The embodiment of Figure 1 relates to a semi-permanent plug-and-socket connection. In the case of a plug-and-socket connection which is to be withdrawable in service for isolation, for example a connection between a withdrawable metal-clad circuit-breaker and an orifice containing a fixed terminal, it will not be desirable to fill the interstice between the circuit-breaker plug and the orifice with the resistive liquid as this would hinder the withdrawal. Figure 2 shows such an embodiment, in which the frusto-conical socket orifice 30 is provided with an internal insulating liner 31 of solid dielectric material into which a co-operating circuit-breaker terminal plug 32 is inserted to engage the fixed terminal 33 of the socket. The liner 31 defines a narrow annular space 34, of frusto-conical form, between its outer surface and the inner surface of the socket orifice 30, and this annular space or interstice 34 is filled with the resistive liquid 35, which extends into contact with the terminal 33 at one end of the layer, via a metal disc 36 inserted in the base of the orifice 30, and into contact with the outer earthed metal casing 37 of the orifice insulation 38 at the other end of the layer of liquid 35. Thus the layer of liquid 35 is enclosed in an interstice provided in the orifice insulation 38 surrounding the actual opening into which the plug 32 is inserted, and provides voltage grading which protects against flash-over across the inner surface of the orifice insulation which is exposed to the air. A liquid reservoir 39 is associated with the annular interstice 34 to allow for expansion.

In a further embodiment illustrated in Figure 3 the invention is applied to a bushing-type insulator, comprising an elongated double-tapered solid insulator 40 of dielectric material which surrounds an elongated conductor 41. Each half of the tapered insulator is surrounded by an outer sleeve or weather-shield 42 of porcelain or other insulating material, which has external ribs 43 for outdoor use. The sleeves 42 are supported at their inner ends by the central earthed metal supporting flange 44 of the bushing, and at the outer end by metal end caps 45 secured to the projecting central conductor 41.

Two narrow elongated spaces 46 of annular section remain between the outside surface of the solid insulator 40 and the inside surfaces of the outer porcelain sleeves 42, and these two spaces 46 are filled with resistive liquid 47 forming hollow frusto-conical layers which are in electrical contact at their ends respectively with the earthed metal supporting flange 44 and to the metal end caps 45. Thus the full conductor-to-earth voltage is applied longitudinally to each of the two layers 47 of resistive liquid which thus provide voltage grading protecting the outer surfaces of the bushing against flashover.

A good voltage distribution along each layer 47 of resistive liquid will normally be obtained if the resistance of the liquid layer is uniform along the length of the bushing. Accordingly, to compensate for the fact that the bushing diameter at the flange 44 is greater than its diameter at either end, the thickness of each layer 47 of resistive liquid is made greater at its outer end than at its inner end adjacent to the flange, by suitably grading the radial thickness of the conical spaces 46, as shown in the figure.

While a uniform resistance per unit length of the liquid layers 47 will usually give good voltage distribution, in some cases it may be necessary to compensate for the accumulation near the flange 44 of capacitance and in-phase leakage currents across the bushing, by lowering the grading resistance near the flange, i.e. by increasing the cross-section of each liquid layer 47 in that region. Such compensation however, is usually unnecessary.

A reservoir of the resistive liquid 48 is provided at the bushing flange, communicating with both annular interstices on both sides of the flange.

In another embodiment illustrated in Figure 4 the invention is applied to the provision of resistance-type voltage grading in an elongated suspension insulator 50 comprising an elongated core 51 of suitable insulating material provided with metal suspension eyes 52 or other fittings embedded in both ends of the core. The two metal suspension eyes 52 form the two electrodes in this case, separated by the solid insulation of the core 51, and in service one of the eyes will support a high-voltage conductor whilst the other is secured to a suitable supporting member at earth potential. The central core 51 provides the necessary mechanical strength for the insulator.

The insulating core 51 is surrounded by a porcelain sleeve 53 provided with weather sheds 54, which is held in position by a pair of flanged metal end caps 55 connected to the metal eyes 52. A cylindrical space or interstice 56 of narrow annular cross-section remains between the central core 51 and the inner surface of the porcelain sleeve 53, and this space 56 is filled with the resistive liquid 57 to provide voltage grading over the length of the insulator 50 between the two metal eyes 52. A uniform resistance per unit length over the length of the liquid layer 57 will normally give satisfactory voltage distribution, but should non-uniform voltage distribution ever prove necessary this can be achieved by varying the thickness of the annular space 56 between the insulating core and the sleeve. A liquid reservoir 58 is associated with the annular space 56 to allow for expansion as before.

In the four specific embodiments illustrated in Figures 1 to 4, the resistive liquid is in each case contained in an elongated tubular space of annular cross-section. This is convenient in the case of the semi-permanent plug-and-socket connection of Figure 1, since there the annular space is already in existence and can conveniently be filled with resistive liquid. In the other three embodiments, however, special arrangements have to be made to provide an annular space to hold the liquid, and it may be more convenient to provide one or more differently shaped apertures extending between the electrodes to hold the resistive liquid, particularly if the solid insulation associated with the electrode is of moulded type, since manufacturing difficulties limit the smallness and regularity which can be achieved in an annular-sectioned aperture. It is desirable to make the area of cross-section of the space occupied by the liquid as small as possible in order to reduce the resistivity of the liquid to be used as the grading medium.

Thus Figure 5 illustrates a cross-section of a bushing-type insulator 60 in which each half of the double-tapered insulator 60 is formed with a series of narrow internal longitudinal tunnels 61 extending from the flange to the outer end of the bushing and spaced circumferentially around the insulator close to its outer surface. These tunnels 61, of which there are in this case eight, act as containers for columns of the resistive conducting liquid 62 which provide the required voltage grading between the central conductor 63 and the earthed flange. The internal tunnels 61 may be formed by moulding the insulator 60 around a series of appropriately spaced solid rods and subsequently withdrawing the rods leaving the tunnels ready to receive the liquid.

A similar arrangement of circumferentially spaced tunnels may be provided in the orifice insulation of the withdrawable circuit-breaker switchgear embodiment described above, with reference to Figure 2, instead of using a liner in the orifice to define an annular space for the liquid.

Figure 6 shows a modified form of the suspension insulator of Figure 4, in which the insulating core 70 may be moulded with a single coaxial tunnel 71 extending between its two ends and in communication with the two metal suspension eyes 72, and this single tunnel 71 contains the conducting liquid 73. In another modification illustrated in Figure 7 the insulating core 80 of the suspension insulator is provided with a helical tunnel 81 formed by moulding the core around a helical coil of wire and then withdrawing the wire leaving the helical tunnel 81 formed in the insulator 80 coaxially with it and close to its surface. The resistive liquid fills the tunnel in electrical contact with the metal eyes at the ends of the insulator. This latter arrangement is particularly advantageous as it gives a very long tunnel, of correspondingly small section, in relation to the axial length of the insulator.

In each of the embodiment of Figures 5, 6 and 7 no outer porcelain sleeve is needed and the moulded insulator is provided with separate or integrally moulded external ribs or weather sheds if desired.

What we claim as our invention and desire to secure by Letters Patent is:

1. A pair of aligned elongated high-voltage electrical conductors each embedded in a separate sleeve of solid insulation enclosed in an outer earthed metal casing, the conductors being semi-permanently connected together at their adjacent ends and the adjacent ends of the solid insulation sleeve being respectively formed as a plug and as a co-operating socket into which the plug is inserted, and an elongated liquid voltage-grading resistor of high resistivity and of high dielectric strength contained in a hollow tubular interstice between the opposed surfaces of the plug and the socket, and in electrical contact with the interconnected conductors at one end of the interstice and with the outer earthed metal case at the other end of the interstice, the liquid resistor having such electrical conductivity as to pass between the interconnected conductors and the outer metal casing a small in-phase leakage current of the same order of magnitude as the quadrature current.

2. A high-voltage terminal orifice bushing comprising a solid insulation member formed with a re-entrant orifice, a high-voltage terminal within the orifice at its base, and an earthed metal outer casing surrounding the rim of the orifice, and a solid insulating tubular liner within the orifice, the internal surface of the orifice in the solid insulation member and the opposed outer surface of the liner being spaced apart to provide an elongated interstice of hollow tubular shape which extends from the base to the rim of the orifice, and an elongated liquid voltage-grading resistor of high resistivity and of high dielectric strength contained in the interstice in electrical contact with the terminal at the one end of the interstice and with the earthed metal casing at the other end of the interstice, the electrical conductivity of the liquid resistor being such as to pass between the terminal and the earthed metal casing a small in-phase leakage current.

3. A high-voltage thoroughfare insulating bushing comprising an elongated solid insulating core, a high-voltage conductor embedded in the core and protruding from it at both ends, and an earthed metal supporting flange surrounding the core at its central part only, and a pair of outer tubular sleeves of solid insulating material surrounding the core and each extending from the flange to one end of the core, the inner surface of each sleeve being spaced from the outer surface of the core to form a tubular interstice, and an elongated liquid voltage-grading resistor of high resistivity and of high dielectric strength filling each interstice in electrical contact with the conductor at the outer end of the interstice and with the flange at the inner end, the electrical conductivity of each liquid resistor being such as to pass a small in-phase leakage current between the conductor and the earthed metal flange.

4. A suspension insulator comprising an elongated core of solid insulating material and a pair of metal suspension fittings secured respectively to the two ends of the core, between which a high voltage exists in service, and an outer elongated tubular sleeve of solid insulating material surrounding the insulating core and spaced from it so as to enclose a tubular interstice extending the whole length of the core and an elongated liquid voltage-grading resistor of high resistivity and high dielectric strength filling the interstice in electrical contact with the two suspension fittings respectively at the two ends of the interstice, the electrical conductivity of the liquid resistor being such as to pass a small in-phase leakage current between the two suspension fittings.

5. A suspension insulator comprising an elongated solid insulating member and a pair of metal suspension fittings respectively secured to the two ends of the insulating member, the insulating member being formed with an internal tunnel extending between its two ends, and an elongated liquid voltage-grading resistor of high resistance and of high electrical conductivity in electrical contact with the two suspension fittings, the electrical conductivity of the liquid resistor being such as to pass a small in-phase leakage current between the suspension fittings.

6. A suspension insulator as claimed in claim 5 in which the said tunnel comprises a helix whose total peripheral length is many times the distance between the suspension fittings.

References Cited in the file of this patent

UNITED STATES PATENTS

| | | |
|---|---|---|
| 677,498 | Caldwell | July 2, 1901 |
| 1,361,800 | Allcutt | Dec. 14, 1920 |
| 1,773,715 | Austin | Aug. 26, 1930 |
| 1,966,163 | Clark | July 10, 1934 |
| 2,253,264 | Burleson | Aug. 19, 1941 |
| 2,261,633 | Spooner | Nov. 4, 1941 |
| 2,452,737 | Eisenstein et al. | Nov. 2, 1948 |
| 2,463,428 | Rieke | Mar. 1, 1949 |